Jan. 13, 1953     L. C. SAYERS     2,625,186
BAND SAW CIRCLE CUTTER GUIDE
Filed Jan. 30, 1951     2 SHEETS—SHEET 1
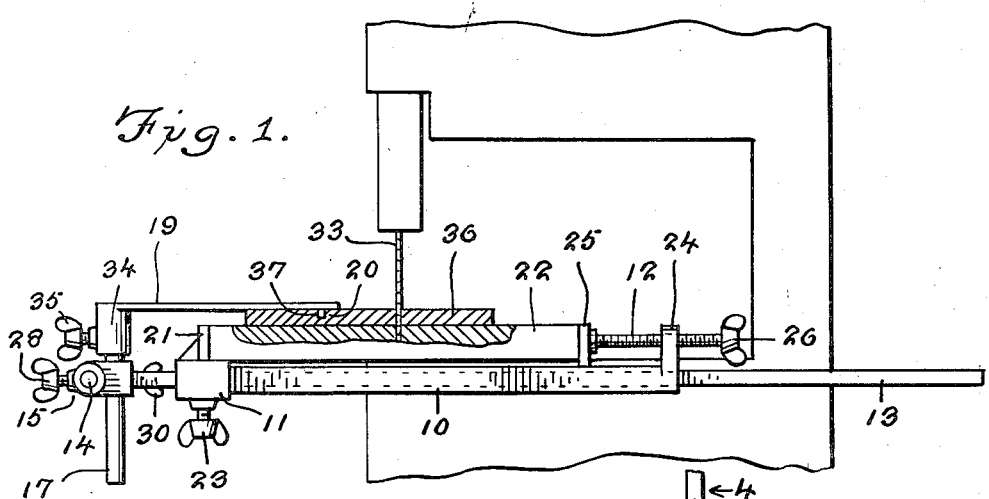
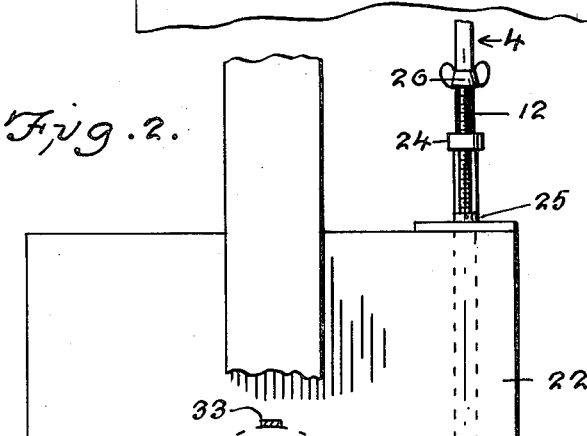
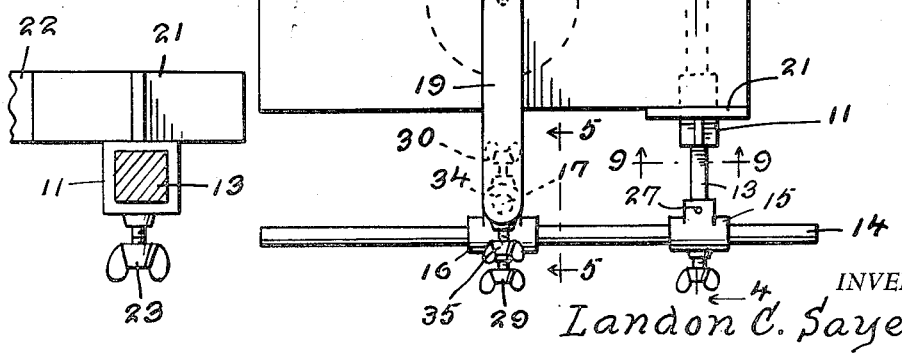
INVENTOR.
Landon C. Sayers
BY Victor J. Evans & Co.
ATTORNEYS Jan. 13, 1953 L. C. SAYERS 2,625,186
BAND SAW CIRCLE CUTTER GUIDE
Filed Jan. 30, 1951 2 SHEETS—SHEET 2
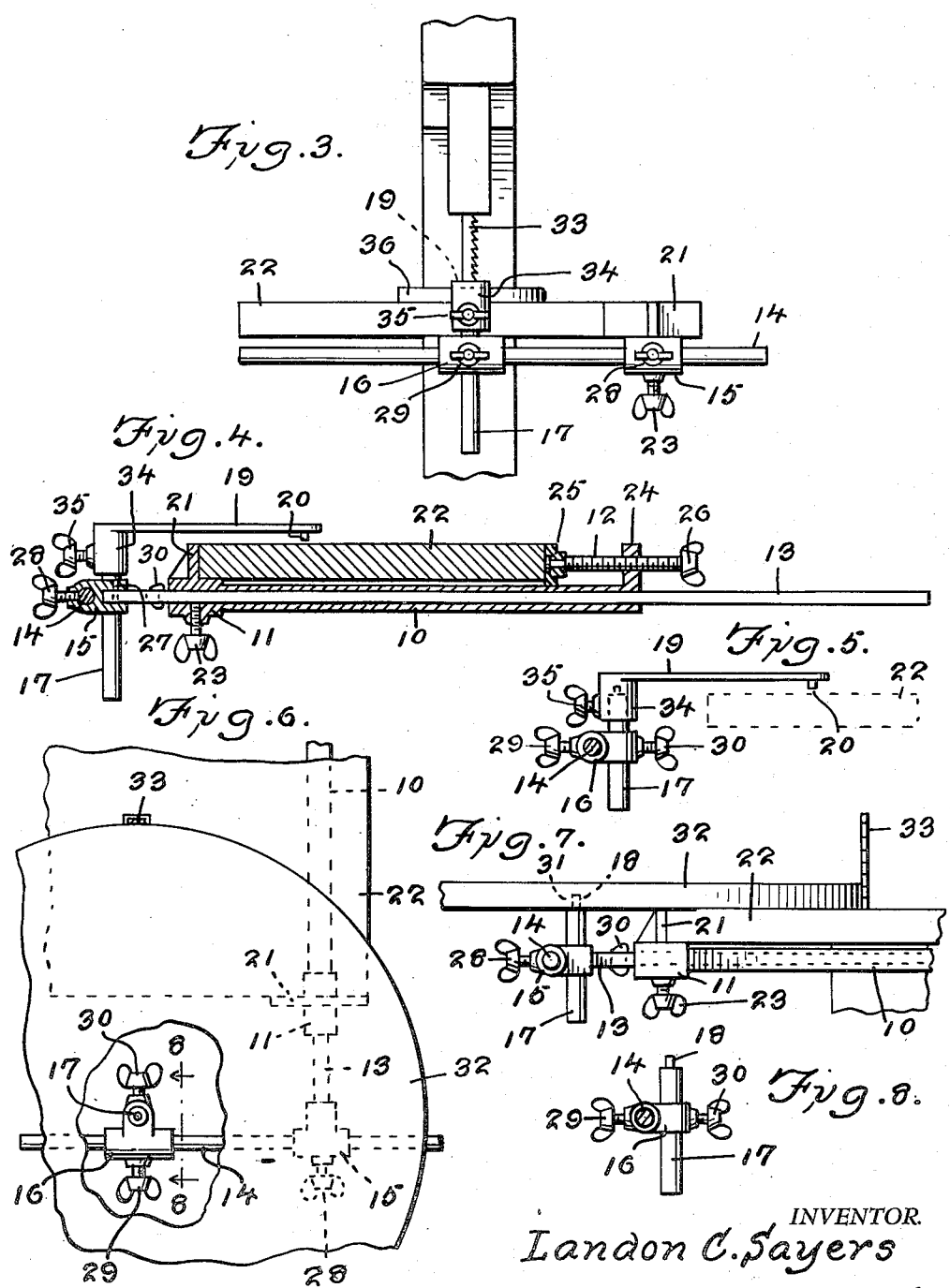
INVENTOR.
Landon C. Sayers
BY Victor J. Evans &Co.
ATTORNEYS Patented Jan. 13, 1953

2,625,186

UNITED STATES PATENT OFFICE 2,625,186

BAND SAW CIRCLE CUTTER GUIDE

Landon C. Sayers, Tazewell, Va.

Application January 30, 1951, Serial No. 208,595

3 Claims. (Cl. 143—171)

This invention relates to attachments for band saws, and in particular material holding elements clamped to the table of a band saw for providing centers about which material is rotated whereby circular objects may be cut from panels and the like.

The purpose of this invention is to provide an attachment for a band saw whereby a center is adjustably mounted in relation to the saw table so that a panel rotated about the center may be cut by the saw to provide a true circular object.

Various devices have been used in combination with saw tables of band saws for holding materials whereby panels may be cut to form circles but it is difficult to provide means for holding materials for circular movement on a saw table without drilling openings in the saw table. With this thought in mind this invention contemplates a clamp disposed against the side of a saw table and which is provided with telescoping and slidably mounted bars which carry centers whereby the centers may be adjustably mounted on the side of the saw table or positioned on an arm extended over the table so that with pins positioned on the center panels with openings therein to receive the pins may be rotated in relation to a band saw so that the saw cuts the panels to form circular objects.

The object of this invention is, therefore, to provide an attachment for holding objects on saw tables of band saws for cutting circular objects in which the attachment is rigidly held to the saw table by clamping means.

Another object of the invention is to provide an attachment for cutting circular objects with band saws that may be attached to saws now in use without changing the design or construction thereof.

A further object of the invention is to provide an attachment for cutting circular objects with band saws which is of a simple and economical construction.

With these and other objects and advantages in view the invention embodies a tube having clamping means at the ends thereof for securing the tube to the table of a band saw, a rod slidably mounted in the tube and held in adjusted positions by a thumb screw, a bar slidably mounted in a tubular socket on the end of the rod and having a head slidably mounted thereon, a vertically disposed post adjustably mounted in the head, and an arm adjustably mounted on the post and extended over the table of the saw for providing a center on the table.

Other features and advantages of the invention will appear from the following description taken in connection with the drawings wherein:

Figure 1 is an end elevational view showing a saw table with parts of a saw frame on which the table is positioned and with parts of the table broken away and shown in section.

Figure 2 is a plan view of the saw table with the parts as shown in Figure 1 mounted thereon.

Figure 3 is a front elevational view illustrating the attachment clamped to the table of the band saw as shown in Figures 1 and 2.

Figure 4 is a longitudinal section through a mounting tube of the attachment being taken on line 4—4 of Figure 2 and showing the center carrying arm in elevation.

Figure 5 is a detail showing a section taken on line 5—5 of Figure 2 illustrating the mounting and head of the attachment.

Figure 6 is a plan view, similar to that shown in Figure 2 showing the attachment with the arm removed whereby a center is provided for cutting circular objects, the sizes of which are larger than the saw table.

Figure 7 is an end elevational view of the attachment with the parts as shown in Figure 6.

Figure 8 is a detail showing a section taken on line 8—8 of Figure 6 showing the center post mounting head.

Figure 9 is a detail showing a section taken on line 9—9 of Figure 2 illustrating the formation of the mounting clamp.

Referring now to the drawings wherein like reference characters denote corresponding parts the band saw circle cutting attachment of this invention includes a tube 10 having a clamp 11 at one end and an adjusting screw 12 at the other, a bar 13 slidably mounted in the tube, a rod 14 slidably mounted in a socket 15 on the end of the bar and having a head 16 thereon, a post 17 carried by the head and having a center 18 on the upper end, and an arm 19 mounted on the post and having a center 20 extended downwardly from the under surface of the outer end thereof.

As illustrated in Figures 1 and 9 the tube 10 is formed with flat sides and the bar 13 is of a similar shape whereby the bar is held in position so that the rod 14 is supported in a horizontally disposed position across the front of the table. The socket 11 on the end of the tube 10 is provided with a projection 21 that engages the forward edge of the saw table 22 and the bar 13 is secured in adjusted positions in the sleeve by a thumb screw 23. The opposite end of the tube is provided with an extension 24 in which the adjusting screw 12 is threaded and, as illustrated in Figure 1 the adjusting screw is provided with a clamping washer 25 on the inner end and a head 26, similar to a thumb nut on the opposite end.

The sleeve 15 is secured on the end of the bar 13 by a pin 27 and the rod 14 is secured in the sleeve 15 by a thumb screw 28.

The head 16 is slidably mounted on the rod 14 and a thumb screw 29 therein secures the head in adjusted positions.

The post 17 is adjustably secured in the head 16 by a thumb screw 30 and with the parts as illustrated in Figures 6 and 7 the center 18 on the upper end of the post 17 may be used without the arm 19 whereby with the center 18 positioned in a socket 31 in the under side of a panel 32 the panel is rotated about the center with the band saw, as indicated by the numeral 33 cutting the panel to form a circle, as illustrated in Figure 6.

When it is desired to use the attachment for cutting small circles the hub 34 of the arm 19 is secured on the upper end of the post 17 by a thumb screw 35 and material, as indicated by the numeral 36 is positioned on the saw table with the pin 20 or the arm 19 in a centrally disposed socket 37 in the upper surface of the material. With the parts in this position the material 36 is rotated about the center or point 20 and the saw cuts a circular object as indicated by the numeral 38 in Figure 2.

With the parts arranged in this manner the attachment, including the tube 10, is clamped to the saw table 22, as illustrated in Figures 1 and 4 and the centers 18 or 20 are set to a distance from the saw 33 corresponding with the radius of an object it is desired to cut and with the centers positioned in notches in panels, from which it is desired to cut the objects, one or any number of objects may readily be cut by rotating the panels about the centers.

It will be understood that modifications may be made in the design and arrangement of the parts without departing from the spirit of the invention.

What is claimed is:

1. A band saw attachment comprising a tube having flat sides with a projection at one end and an adjusting screw at the other end, said adjusting screw being positioned to coact with the projection for clamping the tube in a horizontal position below a saw table, a bar slidably mounted in the said tube, means clamping the bar in adjusted positions in the tube, a tubular socket having a thumb screw therein carried by the outer end of the bar, a rod slidably mounted in the tubular socket of the bar, a head having a vertically disposed socket therein slidably mounted on the rod, a post having a center point on the upper end adjustably mounted in the vertically disposed socket of the head, and thumb screws in the said head for securing the head in adjusted positions on the rod and the post in adjusted positions in the head, said tubular socket being horizontally disposed and being arranged in alignment with said bar.

2. A band saw attachment comprising a tube having flat sides with a projection at one end and an adjusting screw at the other end, said adjusting screw adapted to coact with the projection for clamping the tube in a horizontal position below a saw table, a bar slidably mounted in the said tube, means clamping the bar in adjusted positions in the tube, a tubular socket having a thumb screw therein carried by the outer end of the bar, a rod slidably mounted in the tubular socket of the bar, a head having a vertically disposed socket therein slidably mounted on the rod, a post having a center point on the upper end adjustably mounted in the vertically disposed socket of the head, thumb screws in the said head for securing the head in adjusted positions on the rod and the post in adjusted positions in the head, and an arm having a center point thereon adjustably mounted on the post, said tubular socket being horizontally disposed and being arranged in alignment with respect to said bar.

3. A band saw attachment comprising a tube having flat sides with a projection at one end and an adjusting screw at the other end, said adjusting screw adapted to coact with the projection for clamping the tube in a horizontal position below a saw table, a bar slidably mounted in the said tube, means clamping the bar in adjusted positions in the tube, a tubular socket having a thumb screw therein carried by the outer end of the bar, a rod slidably mounted in the tubular socket of the bar, a head having a vertically disposed socket therein slidably mounted on the rod, a post having a center point on the upper end adjustably mounted in the vertically disposed socket of the head, thumb screws in the said head for securing the head in adjusted positions on the rod and the post in adjusted positions in the head, an arm having a center point thereon adjustably mounted on the post, said arm having a hub positioned on the post, and a thumb screw in the hub for securing the arm in adjusted positions on the said post, said tubular socket being horizontally disposed and arranged in alignment with respect to said bar.

LANDON C. SAYERS.

REFERENCES CITED

The following references are of record in the file of this patent:

UNITED STATES PATENTS

| Number | Name | Date |
| --- | --- | --- |
| 2,569,424 | Mayhew et al. | Sept. 25, 1951 |

FOREIGN PATENTS

| Number | Country | Date |
| --- | --- | --- |
| 427,827 | Great Britain | May 1, 1945 |
| 609,574 | Great Britain | Oct. 4, 1948 |